United States Patent
Mitsumoto (10) Patent No.: US 11,831,007 B2
(45) Date of Patent: Nov. 28, 2023

(54) SI-BASED NEGATIVE ELECTRODE ACTIVE MATERIAL

(71) Applicant: Mitsui Mining & Smelting Co., Ltd., Tokyo (JP)

(72) Inventor: Tetsuya Mitsumoto, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 181 days.

(21) Appl. No.: 16/637,056

(22) PCT Filed: Aug. 10, 2018

(86) PCT No.: PCT/JP2018/030062
§ 371 (c)(1),
(2) Date: Feb. 6, 2020

(87) PCT Pub. No.: WO2019/031601
PCT Pub. Date: Feb. 14, 2019

(65) Prior Publication Data
US 2020/0243847 A1    Jul. 30, 2020

(30) Foreign Application Priority Data
Aug. 10, 2017 (JP) ................................. 2017-155859

(51) Int. Cl.
*H01M 4/36* (2006.01)
*H01M 4/58* (2010.01)
(Continued)

(52) U.S. Cl.
CPC ........... *H01M 4/364* (2013.01); *H01M 4/386* (2013.01); *H01M 4/58* (2013.01); *H01M 10/052* (2013.01);
(Continued)

(58) Field of Classification Search
None
See application file for complete search history.

(56) References Cited

U.S. PATENT DOCUMENTS

| | | |
|---|---|---|
| 6,548,208 B1 | 4/2003 | Kasamatsu et al. |
| 8,808,468 B2 | 8/2014 | Waeckerle et al. |

(Continued)

FOREIGN PATENT DOCUMENTS

| | | | |
|---|---|---|---|
| CN | 104638234 A | * | 5/2015 |
| CN | 104638234 A | | 5/2015 |

(Continued)

OTHER PUBLICATIONS

Yamamoto et al., "The Fine Structure and the Electrode-Characteristic of the TiSi2—Si Alloy as Anode Material for the Lithium Ion Secondary Cell", 2005, pp. 480-481, English-language Abstract.

*Primary Examiner* — Zhongqing Wei
(74) *Attorney, Agent, or Firm* — The Webb Law Firm (57) ABSTRACT

A Si-based negative electrode active material that is capable of improving cycle characteristics, reducing or eliminating a plateau region in the discharge profile, and further improving high-rate characteristics. The Si-based negative electrode active material contains Si and a compound containing Si and a semimetal/metal element M, wherein the content of Si in the negative electrode active material is more than 50 wt %; the content of oxygen atoms (O) is less than 30 wt %; the content of the semimetal/metal element M is more than 10 wt % and less than 50 wt %, wherein in an X-ray diffraction pattern as measured by a powder X-ray diffraction (XRD) device using Cu-Kα1 rays, the full width at half maximum of the peak of the (111) plane of Si is 0.25° or more; and wherein the peak intensity of the peak of the (111) plane of Si is less than 20,000 cps; and the true density is 2.5 g/cm³ or more.

10 Claims, 1 Drawing Sheet

(51) Int. Cl.
*H01M 4/38* (2006.01)
*H01M 10/052* (2010.01)
*H01M 4/02* (2006.01)

(52) U.S. Cl.
CPC .............. *H01M 2004/021* (2013.01); *H01M 2004/027* (2013.01)

(56) References Cited

U.S. PATENT DOCUMENTS

| | | | |
|---|---|---|---|
| 9,234,261 B2 | 1/2016 | Tetyukhin et al. | |
| 9,373,839 B2 | 6/2016 | Jeong et al. | |
| 2004/0224040 A1 | 11/2004 | Furuya | |
| 2009/0061322 A1 | 3/2009 | Kawakami et al. | |
| 2015/0325853 A1 | 11/2015 | Shimoi et al. | |
| 2016/0181598 A1* | 6/2016 | Suh | C22C 24/00 429/219 |

FOREIGN PATENT DOCUMENTS

| | | | | |
|---|---|---|---|---|
| CN | 105720259 A | | 6/2016 | |
| EP | 3038193 A1 | | 6/2016 | |
| JP | 2000285919 A | | 10/2000 | |
| JP | 2008123814 A | | 5/2008 | |
| JP | 2010135336 A | | 6/2010 | |
| JP | 2011518943 A | | 6/2011 | |
| JP | 2013125743 A | | 6/2013 | |
| JP | 2013168328 A | * | 8/2013 | |
| JP | 2013168328 A | | 8/2013 | |
| JP | 2014513197 A | | 5/2014 | |
| JP | 2014116297 A | | 6/2014 | |
| JP | 201635825 A | | 3/2016 | |
| JP | 201639098 A | | 3/2016 | |
| JP | 2016035825 A | * | 3/2016 | ............ C01B 33/32 |
| WO | 0181033 A1 | | 11/2001 | |

* cited by examiner

SI-BASED NEGATIVE ELECTRODE ACTIVE MATERIAL

CROSS-REFERENCE TO RELATED APPLICATIONS

This application is the United States national phase of International Application No. PCT/JP2018/030062 filed Aug. 10, 2018, and claims priority to Japanese Patent Application No. 2017-155859 filed Aug. 10, 2017, the disclosures of which are hereby incorporated by reference in their entirety.

TECHNICAL FIELD

The present invention relates to a Si-based negative electrode active material that can be used for nonaqueous electrolyte secondary batteries such as a lithium secondary battery, or solid batteries using a solid electrolyte.

BACKGROUND ART

A negative electrode of nonaqueous electrolyte secondary batteries is generally produced by mixing particles of an active material formed from a material, into which lithium ions can be inserted by charging, with a binder, a conductive material, and a solvent; applying the mixture thus obtained on the surface of a current collector; drying the mixture to form a coating film; and further, press processing the coating film.

In recent years, along with the development in applications such as electric vehicles and smart phones, there is an increasing demand for higher capacity and longer life of batteries. Currently, most of the negative electrodes of batteries commercially available use a carbon material (also referred to as "graphite") as the negative electrode active material. However, this active material has already reached the theoretical limit in terms of capacity, and it is now necessary to develop new negative electrode active materials. One of the promising candidates thereof is an active material containing silicon (also referred to as "silicon-based active material").

The silicon-based active material has a potential that the capacity per mass is 5 to 10 times that of graphite. On the other hands, the silicon-based active material has a problem that the electron conductivity is not so high compared with graphite.

Thus, in order to increase the electron conductivity of the silicon-based active material, for example, it has been suggested to add a conductive auxiliary agent for the purpose of imparting electron conductivity between a current collector and the active material. For example, Patent Document 1 discloses that the periphery of core particles containing silicon is coated with a silicon solid solution such as $Mg_2Si$, CoSi, or NiSi, and the surface is further coated with a conductive material such as graphite or acetylene black.

Also, since the silicon-based active material undergoes large volumetric changes caused by intercalation and deintercalation of lithium ions and repeats expansion and contraction during charge and discharge cycles, the silicon-based active material has a problem that separation from the conductive auxiliary agent tends to occur as charging and discharging are repeated, consequently, deterioration of cycles and reduction of energy density occurs, the battery performance is decreased, and safety of the battery is lowered.

In order to solve this problem, for example, Patent Document 2 discloses active material particles containing silicon and having an average particle diameter of 5 μm or more and 25 μm or less. It is stated in the Patent Document 2 that, when the average particle diameter of the active material particles is adjusted to 5 μm or more, the specific surface area of the original active material can be reduced, the contact area between an electrolyte and the newly generated surfaces of the active material can be reduced thereby, and thus the effect of improving the cycle characteristics and the effect of suppressing the swelling of the active material are increased.

Also, Patent Document 3 discloses an electrode material for lithium secondary batteries as an electrode material having high efficiency in intercalating and deintercalating of lithium, wherein in an electrode material for lithium secondary batteries composed of solid state alloy particles containing silicon as a main component, the solid state alloy particles have a microcrystal or amorphous material composed of an element other than silicon, dispersed in microcrystalline silicon or amorphized silicon.

CITATION LIST

Patent Document

Patent Document 1: Japanese Patent Laid-Open No. 2000-285919
Patent Document 2: Japanese Patent Laid-Open No. 2008-123814
Patent Document 3: Japanese Patent Laid-Open No. 2010-135336

SUMMARY OF THE INVENTION

As disclosed in Patent Document 3, when a material in which a microcrystal or amorphous material composed of an element other than silicon is dispersed in silicon (Si) or a material in which an alloy of elements other than silicon is dispersed in silicon (Si) is used as a negative electrode active material, only the silicon (Si) in the negative electrode active material contributes to the intercalation and deintercalation of lithium ions. Therefore, when the occupation ratio of silicon (Si) is lowered, the capacity is lowered, but the expansion and contraction of the negative electrode active material can be suppressed, and the cycle characteristics must be able to be improved theoretically.

However, for example, when the alloy of elements other than silicon is mixed in silicon (Si) and actually used as a negative electrode active material for lithium secondary batteries, it has been found that the cycle characteristics cannot be improved as expected.

In addition, it has been examined that the Si-based negative electrode active material is used as a negative electrode active material in combination with a carbon material such as graphite. However, when the Si-based negative electrode active material is used as a negative electrode active material in combination with a carbon material, there is a problem that both of the materials operate separately depending on differences in charge and discharge curve profiles, which makes difficult to control.

With regard to the above, it has been examined by the present inventors and found that, as compared with the discharge profile of the carbon material (graphite), the discharge profile of the Si-based negative electrode active material has a plateau region different from the operating potential of the carbon material (graphite), and thus when the Si-based negative electrode active material is used as a negative electrode active material in combination with the carbon material, a step part is generated in the charge and discharge curve, which is one of the causes that are difficult to control. Therefore, it can be presumed that by reducing or eliminating the plateau region in the discharge profile of the Si-based negative electrode active material, the step part at the rising part of the charge and discharge curve can be reduced or eliminated, and the control can be facilitated.

Furthermore, in the lithium secondary batteries, rapid charge and discharge characteristics have been demanded, and improvement of the high-rate characteristics, which are important characteristics for rapid charging and discharging, has been also demanded.

Thus, the present invention provides a novel Si-based negative electrode active material that is able to improve the cycle characteristics, to reduce or eliminate the plateau region in the discharge profile, and further to discharge while maintaining the profile even at a high-rate.

The present invention proposes a Si-based negative electrode active material comprising Si and a compound containing Si and a semimetal/metal element M, wherein the content of Si in the negative electrode active material is more than 50 wt %; the content of oxygen atoms (O) is less than 30 wt %; the content of the semimetal/metal element M is more than 10 wt % and less than 50 wt %, wherein in an X-ray diffraction pattern as measured by a powder X-ray diffraction (XRD) device using Cu-Kα1 rays, a full width at half maximum of a peak of a (111) plane of Si is 0.25° or more; a peak intensity of the peak of the (111) plane of Si is less than 20,000 cps; and a true density is 2.5 g/cm$^3$ or more.

The Si-based negative electrode active material proposed by the present invention is able to improve the cycle characteristics by being used in nonaqueous electrolyte secondary batteries, such as lithium secondary batteries, and further to reduce or eliminate a plateau region in the discharge profile. Therefore, the Si-based negative electrode active material proposed by the present invention does not only exert an effect in a single use, but also can be suitably used as a negative electrode active material in combination with, for example, a carbon material (graphite), and further can discharge while maintaining the profile even at a high-rate.

Accordingly, the Si-based negative electrode active material proposed by the present invention can be used suitably not only as a negative electrode active material in nonaqueous electrolyte secondary batteries, such as lithium secondary batteries, but also in combination with graphite.

DESCRIPTION OF THE INVENTION

Next, the present invention will be described based on an example of embodiments. However, the present invention is not limited to the example of the embodiments described below.

<Present Si-Based Negative Electrode Active Material>

A negative electrode active material for nonaqueous electrolyte secondary batteries according to one example of the present embodiment (hereinafter, referred to as "present Si-based negative electrode active material") comprises silicon (Si) and a compound A containing Si and a semimetal/metal element M.

(Si)

In the present Si-based negative electrode active material, the silicon (Si) may be present as a material containing a silicon-containing material as a main component, such as a silicon oxide such as SiO or $SiO_2$, or a silicon compound such as $Si_3N_4$ or SiC, in addition to pure silicon. Among others, a material containing pure silicon as a main component is preferred.

Here, the term "containing pure silicon as a main component" means that the pure silicon occupies 45% by mass or more, preferably 50% by mass or more, more preferably 55% by mass or more of silicon (Si) of the material.

(Compound A)

The present Si-based negative electrode active material is characterized by containing a compound A containing Si and a semimetal/metal element M in addition to the silicon (Si).

Here, the semimetal/metal element M for forming the compound A with Si, that is, the semimetal or metal element for forming the compound A with Si is preferably one or two or more elements selected from the group consisting of B, Ti, V, Mn, Fe, Co, Ni, Cu, Y, Zr, Nb, Mo, Ta, and W.

The compound A, that is, the compound containing Si and the semimetal/metal element M is preferably a silicide represented by $M_xSi_y$ (0.1≤x/y≤7.0).

Examples of the silicide represented by $M_xSi_y$ may include $TiSi_2$, $CoSi_2$, $NiSi_2$, and $Mn_{11}Si_{19}$.

When the compound A is the silicide represented by $M_xSi_y$, the cycle characteristics can be further improved by reducing the crystallinity of the Si in the negative electrode active material containing Si and $M_xSi_y$; the plateau region in the discharge profile can be reduced or eliminated; and further the discharging can be performed while maintaining the profile even at a high-rate.

The ratio "x/y" in the $M_xSi_y$ is preferably 0.1 or more and 7.0 or less, more preferably more than 0.1 or less than 7.0, even more preferably more than 0.2 or less than 4.0, still more preferably more than 0.3 or less than 3.0, furthermore preferably more than 0.4 or less than 2.0.

(Content Ratio of Each Component)

The content of Si in the present Si-based negative electrode active material is preferably more than 50 wt %.

In the present Si-based negative electrode active material, Si is a material which contributes to the intercalation and deintercalation of lithium ions, and thus the capacity can be maintained when the content of Si is more than 50 wt %. However, when the content of Si is too large, expansion and contraction of the negative electrode active material cannot be suppressed, and it is difficult to improve the cycle characteristics.

From such a viewpoint, the content of Si in the present Si-based negative electrode active material is preferably more than 50 wt %, more preferably more than 55 wt % or less than 85 wt %, even more preferably more than 60 wt % or less than 80 wt %, still more preferably more than 63 wt % or less than 78 wt %.

The content of oxygen atoms (O) in the present Si-based negative electrode active material is preferably less than 30 wt %.

When the content of oxygen atoms (O) in the present Si-based negative electrode active material is more than 30 wt %, the ratio of oxygen atoms (O) not contributing to charging and discharging is increased, and the capacity and the charge and discharge efficiency are decreased, which is not preferable. In addition, when the content of oxygen atoms (O) is too small, there is a risk of heat generation and ignition due to a rapid reaction with oxygen in the air, which is not preferable.

From such a viewpoint, the content of oxygen atoms (O) in the present Si-based negative electrode active material is preferably less than 30 wt %, more preferably more than 0 wt % or less than 20 wt %, even more preferably more than 0.1 wt % or less than 15 wt %, still more preferably more than 0.2 wt % or less than 10 wt %, furthermore preferably more than 0.6 wt % or less than 5 wt %.

The content of the semimetal/metal element M for forming the compound A in the present Si-based negative electrode active material is preferably more than 10 wt % and less than 50 wt %.

When the content of the semimetal/metal element M for forming the compound A in the present Si-based negative electrode active material is more than 10 wt %, expansion and contraction of the negative electrode active material can be suppressed, and the cycle characteristics can be improved. However, when the content of the semimetal/metal element M for forming the compound A is too large, it is difficult to maintain the capacity.

From such a viewpoint, the content of the semimetal/metal element M for forming the compound A in the present Si-based negative electrode active material is preferably more than 10 wt % and less than 50 wt %, more preferably more than 11 wt % or less than 40 wt %, even more preferably more than 13 wt % or less than 35 wt %, still more preferably more than 15 wt % or less than 30 wt %.

(Other Component)

The present Si-based negative electrode active material may contain a component other than silicon (Si) and the compound A.

Examples of the component other than silicon (Si) and the compound A may include a component containing the semimetal/metal element M not as a constituting element of the component A but as a compound alone, such as a metal, an oxide, a carbide, or a nitride.

Also, examples of the component other than silicon (Si) and the compound A may include a compound, such as a metal, an oxide, a carbide, or a nitride of one or two or more metal elements selected from the group consisting of H, Li, B, C, O, N, F, Na, Mg, Al, K, Cu, Ca, Ga, Ge, Ag, In, Sn, and Au.

Here, the content of the component other than silicon (Si) and the compound A in the present Si-based negative electrode active material is preferably less than 15 at %, more preferably more than 0 at % or less than 12 at %, even more preferably more than 1 at % or less than 10 at %, still more preferably more than 2 at % or less than 7 at %.

The present Si-based negative electrode active material may contain inevitable impurities derived from a raw material.

Here, the content of the inevitable impurities in the present Si-based negative electrode active material is preferably less than 2 wt %, more preferably less than 1 wt %, even more preferably less than 0.5 wt %.

(Characteristics in X-Ray Diffraction Pattern)

In the X-ray diffraction pattern of the present Si-based negative electrode active material measured by a powder X-ray diffraction (XRD) device using Cu-Kα1 rays, the full width at half maximum of the peak of the (111) plane of Si is preferably 0.25° or more.

The full width at half maximum of the peak of the (111) plane of Si can indicate the degree of crystallinity of Si. Thus, when the full width at half maximum is 0.25° or more, it indicates that the crystallinity is low. As a result, the cycle characteristics can be improved the plateau region in the discharge profile can be reduced or eliminated, and the discharging can be performed while maintaining the profile even at a high-rate. However, when the full width at half maximum of the peak of the (111) plane of Si is too large, the capacity and efficiency of charge and discharge may be lowered.

From such a viewpoint, in the X-ray diffraction pattern, the full width at half maximum of the peak of the (111) plane of Si is preferably 0.25° or more, more preferably more than 0.65° or less than 2.0°, even more preferably more than 0.70° or less than 1.5°, still more preferably more than 0.75° or less than 1.0°.

In the present Si-based negative electrode active material, in order to adjust the full width at half maximum of the peak of the (111) plane of Si within the above range, an element other than Si may be added, a molten liquid may be quenched, or a modification treatment to the Si-based negative electrode active material may be performed. However, the present invention is not limited to such a method.

Further, in the X-ray diffraction pattern of the present Si-based negative electrode active material, the peak intensity of the peak of the (111) plane of Si is preferably less than 20,000 cps.

When the peak intensity of the peak of the (111) plane of Si is less than 20,000 cps, the plateau region in the discharge profile can be reduced or eliminated. However, when the peak intensity of the peak of the (111) plane of Si is too small, the charge and discharge efficiency may be decreased.

From such a viewpoint, in the X-ray diffraction pattern, the peak intensity of the peak of the (111) plane of Si is preferably less than 20,000 cps, more preferably more than 100 cps or less than 4,000 cps, even more preferably more than 200 cps or less than 3,000 cps, still more preferably more than 400 cps or less than 2,000 cps.

In the present Si-based negative electrode active material, in order to adjust the peak intensity of the peak of the (111) plane of Si within the above range, an element other than Si may be added, a molten liquid may be quenched, or a modification treatment may be performed. However, the present invention is not limited to such a method.

In order to specify the crystallinity of Si, not only the full width at half maximum but also the peak intensity is an important factor, and both of these two factors are preferably within the above ranges.

In the X-ray diffraction pattern measured by a powder X-ray diffraction (XRD) device using Cu-Kα1 rays, the ratio of the peak intensity of the peak of the (111) plane of Si to the peak intensity of the main peak of the silicide represented by $M_xSi_y$, (0.1≤x/y≤7.0) is preferably less than 1.

Here, the term "main peak of the silicide" means a peak having the maximum peak intensity among the peaks derived from the silicide.

When the ratio of the peak intensity of the peak of the (111) plane of Si to the peak intensity of the main peak of the silicide represented by $M_xSi_y$ is less than 1, the plateau region in the discharge profile can be more securely reduced or eliminated, which is preferable.

From such a viewpoint, the ratio of the peak intensity of the peak of the (111) plane of Si to the peak intensity of the main peak of the silicide represented by $M_xSi_y$ is preferably less than 1, more preferably less than 0.70, even more preferably less than 0.40.

In order to adjust the ratio of the peak intensity of the peak of the (111) plane of Si to the peak intensity of the main peak of the silicide represented by $M_xSi_y$ within the above range, the amount of the element M may be adjusted, an element other than Si may be added, a molten liquid may be quenched, or a modification treatment may be performed. However, the present invention is not limited to such a method.

(Particle Shape)

The particle shape of the present Si-based negative electrode active material is not particularly limited. For example, a spherical shape, a polyhedral shape, a spindle shape, a plate shape, a scale shape, or an amorphous indeterminate shape, or a combination of those can be used. For example, it has been confirmed that the particle shape thereof becomes spherical by gas atomization, and when pulverized by a jet mill or the like, the particle shape becomes amorphous indeterminate since the particles are split along the grain boundary.

(Crystallite Size of Si)

In the present Si-based negative electrode active material, the crystallite size of Si, particularly the crystallite size of the (111) plane of Si is preferably less than 300 Å.

By reducing the crystallite size of Si, the effect of expansion and contraction can be further suppressed, and the cycle characteristics can be improved. However, it can be considered that it is difficult to reduce the crystallite size of Si to less than 1 Å.

From such a viewpoint, the crystallite size of Si, particularly the crystallite size of the (111) plane of Si is preferably less than 300 Å, more preferably more than 1 Å or less than 250 Å, even more preferably more than 5 Å or less than 200 Å, still more preferably more than 10 Å or less than 150 Å, furthermore preferably more than 20 Å or less than 100 Å.

In the present Si-based negative electrode active material, in order to adjust the crystallite size of Si within the above range, an element other than Si may be added, a molten liquid may be quenched, or a modification treatment may be performed as described below. However, the present invention is not limited to such a method.

(True Density)

The true density of the present Si-based negative electrode active material is preferably 2.5 g/cm³ or more.

When the true density of the present Si-based negative electrode active material is 2.5 g/cm³ or more, the electrode density can be enhanced, and the energy density can be then improved. However, when the true density of the present Si-based negative electrode active material is too high, there is a possibility that the ratio of Si is decreased and the capacity is then reduced.

From such a viewpoint, the true density of the present Si-based negative electrode active material is preferably 2.5 g/cm³ or more, more preferably more than 2.6 g/cm³ or less than 3.9 g/cm³, even more preferably more than 2.7 g/cm³ or less than 3.8 g/cm³, still more preferably more than 2.9 g/cm³ or less than 3.7 g/cm³.

In order to adjust the true density of the present Si-based negative electrode active material within the above range, the amount of the element M may be adjusted. However, the present invention is not limited to such a method.

(D50)

The laser diffraction scattering type particle size distribution measuring method is a measuring method of assuming an aggregated granule as a single particle (aggregated particle), and calculating the particle diameter thereof. D50 according to the measuring method means a 50% volume-cumulative particle diameter, that is, a diameter at a cumulation of 50% from the finer side in a cumulative percentage representation of particle diameter measurement values in terms of volume in a chart of a volume-based particle size distribution.

The D50 of the present Si-based negative electrode active material is preferably less than 4 μm. When the D50 is less than 4 μm, the effect of expansion and contraction can be suppressed, which is preferable. However, when the D50 of the present Si-based negative electrode active material is too small, the specific surface area becomes large, and the side reaction with the electrolyte may be increased.

From such a viewpoint, the D50 of the present Si-based negative electrode active material is preferably less than 4 μm, more preferably more than 0.01 μm or less than 3.5 μm, even more preferably more than 0.05 μm or less than 3.2 μm, still more preferably more than 0.1 μm or less than 3 μm.

In order to adjust the D50 of the present Si-based negative electrode active material within the above range, the D50 is preferably adjusted by changing the crushing conditions or the pulverizing conditions. However, the present invention is not limited to the adjusting method.

(Specific Surface Area)

The specific surface area (SSA) of the present Si-based negative electrode active material is preferably 3 m²/g or more. When the specific surface area (SSA) of the present Si-based negative electrode active material is 3 m²/g or more, the surface is sufficiently modified and the electrode resistance can be reduced, which is preferable. On the other hand, when the SSA of the present Si-based negative electrode active material is too large, the side reaction with the electrolyte may be increased.

From such a viewpoint, the specific surface area (SSA) of the present Si-based negative electrode active material is preferably 3 m²/g or more, more preferably less than 140 m²/g, even more preferably more than 3.1 m²/g or less than 60 m²/g, still more preferably more than 3.2 m²/g or less than 30 m²/g, particularly preferably more than 3.3 m²/g or less than 10 m²/g.

In order to adjust the SSA of the present Si-based negative electrode active material within the above range, it is preferable to adjust the pulverizing conditions or the modifying conditions. However, the present invention is not limited to the adjusting method.

<Method for Producing Present Si-Based Negative Electrode Active Material>

The present Si-based negative electrode active material can be obtained by: mixing silicon (Si) or a silicon (Si)-containing material, a semimetal/metal element M or a semimetal/metal element M-containing material, and optionally other raw materials; heat-melting and atomizing the mixture; crushing or pulverizing as necessary; classifying as necessary; and subjecting to a modification treatment using a modifying apparatus utilizing a strong impact force to reduce the crystallinity of Si. However, the present invention is not limited to such a method.

As the producing fine particles method, a known method may be employed. For example, in the present Si-based negative electrode active material, silicon (Si) or a silicon (Si)-containing material, a semimetal/metal element M or a semimetal/metal element M-containing material, and optionally other raw materials are mixed and heated to obtain a molten liquid, and the molten liquid may be atomized by an atomization method or the like. Alternatively, after obtaining a molten liquid as described above, the molten liquid may be cast by a roll casting method and further pulverized in a non-oxygen atmosphere to be produced fine particles. Other atomizing methods may be employed.

When the raw materials are heated as described above to obtain a molten liquid, a compound A is produced at the time of cooling the molten liquid.

However, as the method for melting the metal in the present invention, an arc-melting process as described in Japanese Patent Laid-Open No. 2010-135336 must not be performed. This is because, as described in paragraph [0029] of Japanese Patent Laid-Open No. 2011-518943 and paragraph [0011] of Japanese Patent Laid-Open No. 2014-513197, oxidation due to residual atmosphere occurs when performing arc-melting. Once a large amount of oxygen is incorporated into the raw materials, it is difficult to eliminate in a post process.

Figure 1:
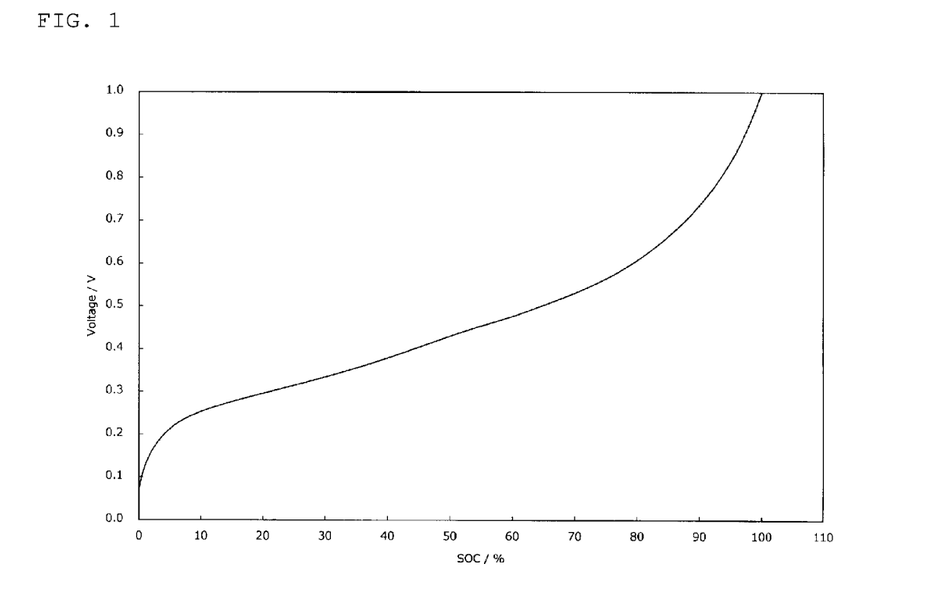
FIG. 1 is a graph showing a discharge profile of a lithium secondary battery using a metal fine powder (sample) obtained in Example 1 as an active material.
Figure 2:
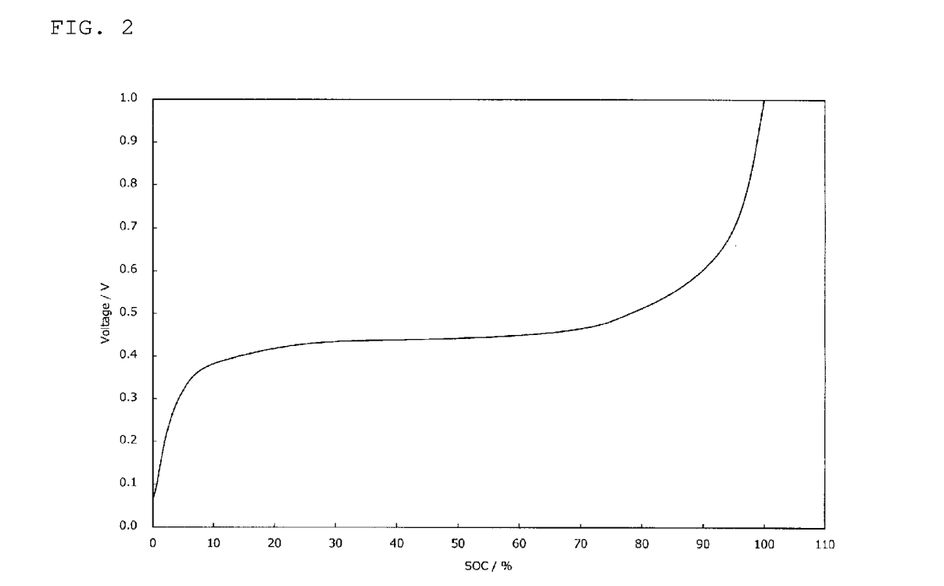
FIG. 2 is a graph showing a discharge profile of a lithium secondary battery using an alloy fine powder (sample) obtained in Comparative Example 1 as an active material.

As the atomization method, for example, a method for atomizing a molten metal dropped into a cooling medium by utilizing the pressure wave generated by inducing boiling caused through spontaneous nucleation, using an apparatus described in FIG. 2 of WO 01/081033, may be employed.

After the atomization, the particle size is preferably adjusted by crushing or pulverizing as necessary, and classifying as necessary.

The modification treatment that is performed using a modifying apparatus utilizing a strong impact force is a modification treatment using an apparatus capable of performing mechanical milling, mechanical alloying, or the like by setting the conditions, and is a treatment capable of enlarging the specific surface area (SSA) of the present Si-based negative electrode active material and reducing the crystallinity of Si as described above.

With this apparatus, the crystallinity of Si can be reduced to a level that cannot be easily reached by a planetary ball mill as described in Japanese Patent Laid-Open No. 2010-135336.

For example, the modification treatment is preferably performed by: using a treatment apparatus equipped with rotating blades in a reaction vessel; setting the rotation frequency of the rotating blades to 700 to 1,500 rpm; and using media having a particle diameter of about 1,500 to 4,000 times with respect to the D50 of the present Si-based negative electrode active material as a medium to be introduced into the reaction vessel.

Taking into consideration that the pin mill rotates at about 9,000 to 10,000 rpm, it can be said that the rotation frequency of the rotating blades is slower than that at the time of fine pulverization treatment. From such a viewpoint, the rotation frequency of the rotating blades is preferably 700 to 1,500 rpm, more preferably 750 rpm or more or 1,500 rpm or less, even more preferably 800 rpm or more or 1,500 rpm or less. Meanwhile, even when the size of the rotating blades is changed, the same effect can be obtained by adjusting the peripheral speed.

Also, in a pulverizer such as a bead mill or a ball mill, it is said that the medium to be introduced into the reaction vessel can be pulverized to about ¹⁄₁,₀₀₀ of its size. Therefore, the use of beads having a particle diameter of about 1,500 to 4,000 times with respect to the D50 of the present Si-based negative electrode active material means that the surface modification is preferentially performed than the pulverization.

From such a viewpoint, the particle diameter of the medium to be introduced into the reaction vessel is preferably 4 to 10 mmϕ, more preferably 5 mmϕ or more or 8 mmϕ or less, even more preferably 5 mmϕ or more or 7 mmϕ or less.

Examples of the material of the medium may include $Al_2O_3$, $ZrO_2$, SiC, $Si_3N_4$, and WC.

<Present Negative Electrode>

As the negative electrode according to the present embodiment (hereinafter, referred to as "present negative electrode"), a negative electrode for nonaqueous electrolyte secondary batteries, in which a coating film containing the present Si-based negative electrode active material, a binder, optionally a conductive material, and optionally graphite as a negative electrode active material is provided on a current collector, can be cited.

(Binder)

As the binder, any of a polyimide, a polyamide, and a polyamideimide may be used. These may be used singly, or two or more kinds thereof may be used in combination (hereinafter, these may also be collectively referred to as "polyimide or the like"). A binder other than these may also be used in combination therewith.

As the polyimide or the like, commercially available products can be used without limitations. Particularly for the polyamide, it is preferable to use a polyamide having a glass transition point Tg of 200 to 400° C. Also for the polyamideimide, it is preferable to use a polyamideimide having a glass transition point Tg of 200 to 400° C.

The polyimide or the like is preferably adhered to at least a part of the surface of the negative electrode active material particles (hereinafter, when simply described as "active material particles", this means "negative electrode active material particles").

A particularly preferred embodiment of the form of adhesion of the polyimide or the like is a form in which the polyimide or the like is adhered planarly to at least a part of the surface of the active material particles. The term "planarly" has the same meaning as film-like, and means a state that is opposite to the state in which objects are scattered in a dotted fashion. Furthermore, the term "adhesion" means a state in which the active material particles and the polyimide or the like are bonded in a state where a mechanical bonding force (for example, an anchoring effect such as engagement or interdigitation) or a chemical bonding force is generated therebetween. A state in which the active material particles and the polyimide or the like are simply mixed, and consequently the two components are only in contact with each other, does not correspond to "adhesion".

A method for adhering the polyimide or the like planarly onto the surface of the active material particles will be described below.

It is preferable that the polyimide or the like does not cover the entire surface of the active material particles, and is adhered to the surface in such a manner that a part where the polyimide or the like is not adhered remains on the surface of the active material particles. Furthermore, it is preferable that adjacent active material particles are in contact with each other at a part where the polyimide or the like is not adhered, and at the same time, the polyimide or the like is adhered and connected around the contact point. As such, the electron conductivity can be secured by bringing the active material particles into contact with each other through a part where the polyimide or the like is not adhered.

It is preferable that the polyimide or the like that is adhered planarly to the surface of the active material particles is connected integrally through a connection site formed by the polyimide or the like that is adhered to the surface of another active material adjacent to the relevant particles. That is, as described above, it is preferable that the active material particles are in contact with adjacent particles, and the polyimide or the like that is adhered around the contact point is connected to each other to form a connection site.

When lithium ions are inserted into the active material particles and the active material particles undergo expansion, the connection site formed by the polyimide or the like can be extended while maintaining a state adhered to the particles. Thereby, detachment of the active material particles from the active material layer due to expansion is effectively prevented, and the cycle characteristics at the time of charging and discharging are improved. Furthermore, this also contributes to suppression of an increase in thickness of the battery accompanying charging. The suppression of an increase in thickness of the battery accompanying charging is particularly effective when the negative electrode of the present invention is applied to a battery that is used in a situation where the battery storage space is limited, such as a battery for mobile phones. On the other hand, when lithium ions are released from the active material particles by discharging, the particles undergo contraction, and the connection site can also undergo contraction along with the contraction of the particles. As such, since the connection site formed by the polyimide or the like connects the active material particles with each other in a manner similar to that of a spring, the particles are effectively prevented from being detached from the active material layer.

In addition to the active material particles being connected with each other through the connection site formed by the polyimide or the like, it is more preferable that plural active material particles are connected in a rosary shape through the connection site described above. Here, the rosary-shaped connection may be a straight form, or may be a meandering form. Moreover, the rosary-shaped connection may literally be in a cyclic form, or may be in a non-cyclic form.

In addition, the rosary-shaped connection may be in the form of a single line, or may be in a branched form. When the plural active material particles are connected in a rosary shape, an increase in volume due to expansion of the active material particles is further relieved by the rearrangement of the rosary-shaped connection, and an increase in thickness of the battery accompanying charging is further suppressed.

In order to connect the plural active material particles in a rosary shape as described above, for example, a negative electrode mixture may be applied on a current collector, and then the negative electrode mixture may be dried by heating at a relatively low temperature as described below. However, the present invention is not limited to this method. It can be considered that when the negative electrode mixture is not dried rapidly but is dried mildly, a pathway through which the solvent is volatilized occurs, and the active material particles may be arranged along the pathway.

The ratio of the polyimide or the like contained in the active material layer is preferably 1 to 15% by mass, more preferably 2% by mass or more or 10% by mass or less, relative to the mass of the active material particles. The ratio of the polyimide or the like contained in the active material layer can be measured by the following method.

When the present negative electrode does not contain any organic material other than the polyimide or the like, the ratio of the polyimide or the like contained in the active material layer can be calculated by determining the mass of organic materials by subtracting the mass of elements other than the organic materials contained in the negative electrode, that is, the mass of inorganic materials such as Si, Cu, Al, Fe, Ca, F, P, and C, from the mass of the negative electrode, and dividing the mass of the organic materials by the mass of the active material layer. Specifically, the mass of the negative electrode is measured first. Furthermore, the active material layer is removed from the negative electrode, and the mass of the current collector is measured. Subsequently, the negative electrode is completely dissolved, and the total mass of inorganic materials is measured using an ICP emission analyzer. Then, the mass of organic materials is calculated by subtracting the total mass of the inorganic materials from the mass of the negative electrode. Also, the mass of constituent materials other than the current collector is calculated from the total mass of the inorganic materials, and the mass of the active material layer is calculated by adding the value thus calculated and the mass of the organic materials. The mass of the organic materials is divided by the mass of the active material layer, and the resultant value is multiplied by 100, so that the ratio of the polyimide or the like contained in the active material layer can be calculated.

The present Si-based negative electrode active material can be used as a single negative electrode active material, or can be used in combination with graphite.

In this case, CMC/SBR or the like may be used as a binder.

(Conductive Material)

As the conductive material, for example, a fine metal powder or a powder of a conductive carbon material such as acetylene black can be used. In the case of using a fine metal powder as the conductive material, it is preferable to use a fine powder of a metal having lithium ion conductivity, such as Sn, Zn, Ag, or In, or of an alloy of these metals.

(Graphite)

By adding graphite as a negative electrode active material to the present Si-based negative electrode active material, both high capacity resulting from silicon and satisfactory cycle characteristics resulting from graphite can be obtained.

In particular, the present Si-based negative electrode active material does not have a plateau region in the discharge profile as described above. Therefore, it can prevent a step part from forming in the discharge profile when the present Si-based negative electrode active material is used in combination with a carbon material (graphite), and the present Si-based negative electrode active material can be easily controlled when used in combination with a carbon material such as graphite as a negative electrode active material, which is preferable.

(Blending Composition)

The content of the binder in the present negative electrode is preferably 1 part to 25 parts by mass, more preferably 2 parts by mass or more or 20 parts by mass or less, relative to 100 parts by mass of the present Si-based negative electrode active material.

Further, in the case of blending a conductive material, the content of the conductive material is preferably 1 part to 15 parts by mass, more preferably 2 parts by mass or more or 10 parts by mass or less, relative to 100 parts by mass of the present Si-based negative electrode active material.

Furthermore, in the case of blending graphite as a negative electrode active material, the graphite is preferably blended such that the mixing mass ratio of the present Si-based negative electrode active material to the graphite is 0.5:95 to 50:50, more preferably 0.5:95 to 20:80.

(Method for Producing Present Negative Electrode)

The present negative electrode can be formed by mixing the present Si-based negative electrode active material (particulate), a binder, a conductive material, a solvent, and optionally other materials such as a carbon material (graphite) to prepare a negative electrode mixture, applying the negative electrode mixture on the surface of a current collector composed of Cu or the like, drying the negative electrode mixture to form a negative electrode active material layer, and then pressing the active material layer as necessary.

The drying after applying the negative electrode mixture on the surface of the current collector is preferably performed in a non-oxygen atmosphere, for example, in a nitrogen atmosphere or an argon atmosphere, for 1 to 10 hours, more preferably for 1 to 7 hours.

Here, a method for producing the present negative electrode in the case of using a polyimide as the binder will be described.

First, the present Si-based negative electrode active material (particulate), a polyimide precursor compound, an organic solvent such as N-methyl-2-pyrrolidone, and optionally a conductive material such as a fine metal powder or acetylene black or a carbon material (graphite) are mixed to prepare a negative electrode mixture, and the negative electrode mixture is applied on the surface of a current collector composed of Cu or the like.

In so doing, a polyamic acid (polyamide acid) can be used as the polyimide precursor compound.

When the negative electrode mixture is applied on the surface of the current collector, the coating film is heated to volatilize the organic solvent, and the polyimide precursor compound is polymerized to obtain a polyimide.

In so doing, by adjusting the polymerization conditions for the relevant precursor compound, the polyimide can be adhered planarly to the surface of the active material particles, and the active material can be connected in a rosary shape through the connection site formed by the polyimide.

With regard to the polymerization conditions for the precursor compound, it has been found by the inventors of the present invention that it is advantageous to perform heating in multiple stages. Particularly, it is advantageous to perform heating in at least two stages, preferably in at least three stages, more preferably in four stages. For example, in the case of performing heating in two stages, it is preferable to perform heating of a first stage at 100 to 150° C., and a second stage at 200 to 400° C.

With regard to the heating time, it is preferable to set the heating time of the first stage to be equal to the heating time of the second stage, or to be longer than that of the second stage. For example, it is preferable to set the heating time of the first stage to 120 to 300 minutes, more preferably to 180 minutes or longer or 240 minutes or shorter, and to set the heating time of the second stage to 30 to 120 minutes, more preferably to 30 to 60 minutes.

In the case of performing heating in three stages, it is preferable to employ a heating temperature that is intermediate between the temperatures of the first stage and the second stage in relation to the heating of two stages as described above.

This intermediate heating is preferably performed at 150° C. to 190° C. The heating time is preferably equal to the time of the first stage or the second stage, or the intermediate time between the first stage and the second stage. That is, in the case of performing heating in three stages, it is preferable to set the heating times of the various stages to be equal, or to shorten the heating time as the stage progresses.

Furthermore, in the case of performing heating in four stages, it is preferable to employ a heating temperature higher than that of the third stage.

It is preferable to perform heating in an inert atmosphere of nitrogen, argon, or the like, regardless of how many stages heating is performed.

Furthermore, at the time of performing a heating treatment, it is also preferable to press the active material layer with a pressing member such as a glass plate. This is because, when the active material layer is treated in this manner, polyamic acid can be polymerized in a state where the organic solvent is abundant, that is, in a state as if the polyamic acid is saturated in the organic solvent, and therefore, the molecular chains of the polyimide thus produced are easily entangled.

By performing the above multistage heating, the organic solvent contained in the negative electrode mixture can be gradually volatilized, thereby sufficiently increasing the molecular weight of the polyamide precursor compound. Also, the polyimide can be adhered over a wide range of the surface of the active material particles, and three-dimensional network voids can be formed in the active material layer over the entire thickness direction.

<Nonaqueous Electrolyte Secondary Battery>

As the nonaqueous electrolyte secondary battery according to the present embodiment (referred to as "present secondary battery"), a battery that can be composed of the present negative electrode, a positive electrode, a separator, a nonaqueous electrolyte, and the like, can be cited.

(Positive Electrode)

The positive electrode is formed, for example, by forming a positive electrode active material layer on at least one surface of a current collector.

The positive electrode active material layer contains a positive electrode active material. As the positive electrode active material, any active material conventionally known in the pertinent technical field can be used without any particular limitations. For example, various lithium transition metal composite oxides can be used. Examples of such materials may include $LiCoO_2$, $LiNiO_2$, $LiMnO_2$, $LiMn_2O_4$, $LiMn_{1.5}Ni_{0.5}O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (wherein $0<x<1/3$), $LiFePO_4$, and $LiMn_{1-z}M_zPO_4$ (wherein $0<z\leq 0.1$, and M represents at least one metal element selected from the group consisting of Co, Ni, Fe, Mg, Zn, and Cu).

(Separator)

As the separator that is used together with the negative electrode and the positive electrode, a non-woven fabric made of a synthetic resin, porous films of polyolefins such as polyethylene and polypropylene, or of polytetrafluoroethylene, and the like are preferably used.

(Nonaqueous Electrolyte)

The nonaqueous electrolyte is formed from a solution in which a lithium salt as a supporting electrolyte is dissolved in an organic solvent. As the organic solvent, for example, one or a combination of two or more kinds of carbonate-based organic solvents such as ethylene carbonate, propylene carbonate, dimethyl carbonate, methyl ethyl carbonate, and diethyl carbonate; and fluorine-based organic solvents obtained by partially fluorinating the carbonate-based organic solvents such as fluoroethylene carbonate, can be used. Specifically, fluoroethylene carbonate, diethyl fluorocarbonate, dimethyl fluorocarbonate, and the like can be used. Examples of the lithium salt may include $CF_3SO_3Li$, $(CF_3SO_2)NLi$, $(C_2F_5SO_2)_2NLi$, $LiClO_4$, $LiAlCl_4$, $LiPF_6$, $LiAsF_6$, $LiSbF_6$, $LiCl$, $LiBr$, $LiI$, and $LiC_4F_9SO_3$. These can be used singly or in combination of two or more kinds thereof.

Explanation of Terms

In the case of being expressed as the term "X to Y" (X and Y are arbitrary numbers) in the present description, unless otherwise stated, the term includes the meaning of "preferably more than X" or "preferably less than Y" along with the meaning "not less than X and not more than Y".

Further, in the case of being expressed as the term "X or more" (X is an arbitrary number) or the term "Y or less" (Y is an arbitrary number), the term also includes the intention of being "preferably more than X" or "preferably less than Y".

EXAMPLES

Next, the present invention will be described further based on Examples and Comparative Examples. However, the present invention is not limited to the following Examples.

Example 1

Ingots of silicon (Si) and titanium (Ti) were mixed and heated to be melted, and the molten liquid that was heated to 1,700° C. was quenched using a liquid quenching solidification apparatus (single roll type) to obtain a quenched thin ribbon alloy. The resulting quenched thin ribbon alloy was roughly pulverized using a dry-type ball mill, and the particle size was adjusted using a jet mill pulverizer under a nitrogen atmosphere (consisting of less than 1% of the air and the balance of vaporized nitrogen from liquid nitrogen (purity of 99.999% or more)) to obtain an alloy fine powder.

The resulting alloy fine powder was subjected to a modification treatment using a nanoparticle surface modification apparatus (product name "Simoroyer", equipped with rotating blades in a reaction vessel). That is, 2 kg of $ZrO_2$ beads and 50 g of the alloy fine powder were placed in a container having a capacity of 2 L, and treated at 1,500 rpm for 3 hours. The alloy fine powder after the treatment was classified with a sieve having an opening of 75 μm to obtain an alloy fine powder (sample) as a negative electrode active material.

The resulting alloy fine powder (sample) was chemically analyzed, and the results were Si: 70 wt % and Ti: 26 wt %.

Example 2

Ingots of silicon (Si) and titanium (Ti) were mixed and heated to be melted, and the molten liquid that was heated to 1,700° C. was quenched using a liquid quenching solidification apparatus (single roll type) to obtain a quenched thin ribbon alloy. The resulting quenched thin ribbon alloy was roughly pulverized using a dry-type ball mill, and the particle size was adjusted using a jet mill pulverizer under a nitrogen atmosphere (consisting of less than 1% of the air and the balance of vaporized nitrogen from liquid nitrogen (purity of 99.999% or more)) to obtain an alloy fine powder.

The resulting alloy fine powder was subjected to a modification treatment using a nanoparticle surface modification apparatus (product name "Simoroyer", equipped with rotating blades in a reaction vessel). That is, 2 kg of $ZrO_2$ beads and 50 g of the alloy fine powder were placed in a container having a capacity of 2 L, and treated at 1,500 rpm for 3 hours. The alloy fine powder after the treatment was classified with a sieve having an opening of 75 μm to obtain an alloy fine powder (sample) as a negative electrode active material.

The resulting alloy fine powder (sample) was chemically analyzed, and the results were Si: 76 wt % and Ti: 20 wt %.

Example 3

Ingots of silicon (Si) and titanium (Ti) were heated to be melted, and the molten liquid that was heated to 1,700° C. was quenched using a liquid quenching solidification apparatus (single roll type) to obtain a quenched thin ribbon alloy. The resulting quenched thin ribbon alloy was roughly pulverized using a dry-type ball mill, and the particle size was adjusted using a jet mill pulverizer under a nitrogen atmosphere (consisting of less than 1% of the air and the balance of vaporized nitrogen from liquid nitrogen (purity of 99.999% or more)) to obtain an alloy fine powder.

The resulting alloy fine powder was subjected to a modification treatment using a nanoparticle surface modification apparatus (product name "Simoroyer", equipped with rotating blades in a reaction vessel). That is, 2 kg of $ZrO_2$ beads and 50 g of the alloy fine powder were placed in a container having a capacity of 2 L, and treated at 1,500 rpm for 3 hours. The alloy fine powder after the treatment was classified with a sieve having an opening of 75 μm to obtain an alloy fine powder (sample) as a negative electrode active material.

The resulting alloy fine powder (sample) was chemically analyzed, and the results were Si: 84 wt % and Ti: 15 wt %.

Example 4

Ingots of silicon (Si), titanium (Ti), and manganese (Mn) were mixed and heated to be melted, and the molten liquid that was heated to 1,700° C. was quenched using a liquid quenching solidification apparatus (single roll type) to obtain a quenched thin ribbon alloy. The resulting quenched thin ribbon alloy was roughly pulverized using a dry-type ball mill, and the particle size was adjusted using a jet mill pulverizer under a nitrogen atmosphere (consisting of less than 1% of the air and the balance of vaporized nitrogen from liquid nitrogen (purity of 99.999% or more)) to obtain an alloy fine powder.

The resulting alloy fine powder was subjected to a modification treatment using a nanoparticle surface modification apparatus (product name "Simoroyer", equipped with rotating blades in a reaction vessel). That is, 2 kg of $ZrO_2$ beads and 50 g of the alloy fine powder were placed in a container having a capacity of 2 L, and treated at 1,500 rpm for 3 hours. The alloy fine powder after the treatment was classified to obtain an alloy fine powder (sample) as a negative electrode active material.

The resulting alloy fine powder (sample) was chemically analyzed, and the results were Si: 66 wt %, Ti: 19 wt %, and Mn: 4 wt %. The silicide was determined using $TiSi_2$ (PDF card of ICDD: 01-071-0187) and $Mn_{11}Si_{19}$ (PDF card of ICDD: 03-065-2862), and the peak around 39° was defined as a main peak of $TiSi_2$ and the peak around 41° was defined as a peak of $Mn_{11}Si_{19}$. The intensity ratio of the peak of Si (111) to the main peak of $M_xSi_y$ was calculated using the total value of the respective peak intensities.

Comparative Example 1

An ingot of silicon (Si) was heated to be melted, and the molten liquid that was heated to 1,700° C. was quenched using a liquid quenching solidification apparatus (single roll type) to obtain a quenched thin ribbon alloy. The resulting quenched thin ribbon alloy was roughly pulverized using a dry-type ball mill, and the particle size was adjusted using a jet mill pulverizer under a nitrogen atmosphere (consisting of less than 1% of the air and the balance of vaporized nitrogen from liquid nitrogen (purity of 99.999% or more)) to obtain an metal fine powder (sample).

The resulting metal fine powder (sample) was chemically analyzed, and the result was Si: 99 wt %.

Comparative Example 2

An ingot of silicon (Si) and massive titanium were mixed at an atomic ratio of 85:15 (weight ratio of 76.8:23.2) and melted using a liquid quenching solidification apparatus (single roll type), and the molten metal was sprayed with an argon gas onto a rotating copper roll to be quenched, thereby producing a Si—Ti alloy. Then, the Si—Ti alloy was pulverized for 2 hours using a silicon nitride ball under an argon gas atmosphere in a planetary ball mill apparatus, to obtain a fine powder electrode material.

Comparative Example 3

Si and B were used in the solid phase A, and these were mixed to obtain a mixture having a weight ratio of 19.9:0.1. The mixture was introduced into a high-frequency melting vessel and melted, and the resulting molten alloy was quenched and solidified by a single roll method to obtain a first alloy ingot. In addition, Ti and Si were used in the solid phase B, and these were mixed to obtain a mixture having an atomic ratio of 1:2. The mixture was introduced into a high-frequency melting vessel and melted, and the resulting molten alloy was quenched and solidified by a single roll method to obtain a second alloy ingot composed of an intermetallic compound represented by a compositional formula $TiSi_2$. Then, the mixture in which the first alloy ingot and the second alloy ingot were mixed at a weight ratio of 20:80 was introduced into a container of a planetary ball mill, and mechanical alloying was performed for 1 hour to obtain a fine powder electrode material.

<Method for Measuring Various Physical Property Values>

Various physical property values of the metal fine powder (sample) obtained in each of Examples and Comparative Examples were measured as follows.

(Composition Analysis)

As for the metal fine powder (sample) obtained in each of Examples and Comparative Examples, the content of each element was measured by inductively coupled plasma (ICP) emission spectroscopy. However, the content of oxygen was measured using an oxygen/nitrogen analyzer (manufactured by LECO Corp.).

(D50)

The metal fine powder (sample) obtained in each of Examples and Comparative Examples was dispersed in water using an ultrasonic homogenizer to obtain a dispersion thereof, and the dispersion was introduced into a water soluble solvent using an automatic sample feeder for laser diffraction particle diameter distribution measuring apparatus ("Microtorac SDC", manufactured by MicrotoracBEL Corp.). The particle size distribution was measured at a flow rate of 40 mL/sec using a laser diffraction particle size distribution analyzer "MT3300II" manufactured by MicrotoracBEL Corp., and the D50 was determined from the obtained volume-based particle size distribution chart.

(Specific Surface Area: SSA)

The specific surface area (SSA) of the fine metal powder (sample) obtained in each of Examples and Comparative Examples was measured as follows.

First, 1.0 g of the sample (powder) was weighed in a glass cell (standard cell) for an automatic specific surface area analyzer, Macsorb (manufactured by Mountech Co., Ltd.), and was set in an auto sampler. The inside atmosphere of the glass was replaced with nitrogen gas, and then a heat treatment was performed at 250° C. for 15 minutes in the nitrogen gas atmosphere. Thereafter, it was cooled for 4 minutes while allowing a mixed gas of nitrogen and helium to flow. After cooling, the sample was measured by a BET single point method.

Here, as the adsorption gas at the time of the cooling and measurement, a mixed gas of 30% of nitrogen and 70% of helium was used.

(True Density)

The true density of the metal fine powder (sample) obtained in each of Examples and Comparative Examples was measured as follows.

First, the sample (powder) was introduced until the seven-tenths of a sample basket of 10 cc, and the amount of the introduced sample was measured. Next, the sample basket in which the sample was introduced was set in a true density analyzer, BELPycno (manufactured by MicrotracBEL Corp.), and the lid was closed to start the measurement.

Here, a helium gas was used for the measurement, and the temperature of the measurement part was controlled at 25° C.±0.1° C.

(X-Ray Diffraction)

Using a powder X-ray diffraction (XRD) device using Cu-Kα1 rays (apparatus name: "Ultima IV", manufactured by Rigaku Corp.), the measurement was performed under the following measurement condition 1 to obtain an X-ray diffraction pattern (also referred to as "XRD pattern").

=XRD Measurement Condition 1=

X-ray source: CuKα (line focus), wavelength: 1.541836 Å

Operation axis: 2θ/θ, measurement method: continuous, counting unit: cps

Initiation angle: 15.0°, termination angle: 120.0°, number of integration times: 1 time Sampling width: 0.01°, scanning speed: 1.0°/min Voltage: 40 kV, current: 40 mA Divergence slit: 0.2 mm, divergence vertical restriction slit: 10 mm Scattering slit: opening, light-receiving slit: opening Offset angle: 0°

Goniometer radius: 285 mm, optical system: focusing method

Attachment: ASC-48

Slit: slit for D/teX Ultra

Detector: D/teX Ultra

Incident-monochro: CBO

Ni-Kβ filter: None

Speed of revolution: 50 rpm

In order to confirm whether or not the fine metal powder (sample) corresponds to the Si-based negative electrode active material specified by the present invention, when performing an XRD measurement, it is preferable to determine whether or not the setting conditions of the XRD measurement are appropriate. For example, a crystalline Si powder containing 99% or more of Si as in Comparative Example 1 is measured, and it is preferable to determine as an index whether or not the peak intensity of the peak around 2θ=28.42° corresponding to the peak of the (111) plane of Si matches the data of the reference material, that is, the peak intensity is about 80,000 to 90,000 cps (amorphous Si powder is not suitable for the index).

In the obtained XRD pattern, it was confirmed that there was no clear peak at 2θ=15 to 18°, and the average value of cps in this range was defined as the intensity A of the background (BG). Next, when the maximum value of cps of the peak around 2θ=28.42° corresponding to the peak of the (111) plane of Si was defined as the peak intensity B based on the card information of ICDD card No.: 00-005-0565 (chemical formula: Si), the difference between the peak intensity B and the intensity A of the background (BG) was defined as the peak intensity C of the peak of the (111) plane of Si (Si (111) peak intensity). The full width at half maximum (FWHM) of the peak was determined and shown in the Table as "Si (111) full width at half maximum".

Here, a method for identifying the silicide represented by $M_xSi_y$ will be described.

The element M was estimated from the result of the chemical analysis, and the identification was performed assuming that the silicide of the element M and Si was formed. The XRD pattern data was read for analysis using an analysis software (product name "PDXL").

Thereafter, the identification was performed by selecting automatic search. Entire sub-files were selected as automatic search targets, and the automatic search was executed by setting the element filter so as to include the element M and Si.

When the automatic search was performed, several card numbers were picked up as crystal phase search results, and a crystal phase candidate having a high consistency of the peak was selected from them. Thereafter, the conformity between the peak position in the XRD pattern data to be analyzed and the peak position of the selected crystal phase candidate was confirmed. When there was no problem, it was used as is, and when there was a deviation between the peak positions, another crystal phase candidate was manually selected again from the card numbers picked up as the crystal phase search results. At the time of reselection, with reference to the quality of the cards set on the ICDD cards, the peak position was confirmed by reselecting the cards in decreasing order of the quality (S→I→B).

The selected ICDD card number of the silicide of the M element and Si was read by the above, and when the maximum value of cps around 2θ (for example, 2θ=39.11° in the case of ICDD card No.: 01-071-0187 of $TiSi_2$) corresponding to the main peak of the silicide of the element M and Si was defined as the intensity D, the difference between the peak intensity D and the intensity A of the background (BG) was defined as the main peak intensity E of the silicide ($M_xSi_y$). Then, the ratio of the peak intensity C (Si (111) peak intensity) of the peak of the (111) plane of Si to the peak intensity E of the main peak of $M_xSi_y$ was shown in Table 1 as "intensity ratio of Si (111) peak to main peak of $M_xSi_y$".

(Crystallite Size of Si (111))

The XRD pattern obtained in the XRD measurement condition 1 was analyzed using an analysis software (product name "PDXL") to determine the crystallite size of Si (111). The XRD pattern data for analysis was read using the analysis software (product name "PDXL").

Thereafter, the identification was performed by selecting the card information reading. The ICDD card number: 00-005-0565 (chemical formula: Si) was determined as a crystal phase candidate, and the data was refined according to a WPPF method. The refinement was continuously performed about 5 times and terminated when it was confirmed that the first decimal place of Rwp and the second decimal place of S did not change.

After performing the above, the crystallite size of Si (111) in the peak list was confirmed and shown in Table 1.

(Production of Electrode)

The metal fine powder (sample) obtained in each of Examples and Comparative Examples, a conductive material, and a binder were mixed in a mixing ratio of 85:5:10 (% by weight), and the mixture was dispersed into N-methyl pyrrolidone to obtain a negative electrode mixture. As the conductive material, acetylene black was used. As the binder, polyimide was used. The negative electrode mixture was applied onto an electrolytic copper foil having a thickness of 15 μm. The coating was dried to form a negative electrode active material layer, thereby obtaining a negative electrode.

(Electrode Resistance)

The negative electrode was punched into a size of 50 mm×100 mm, and was pressed at 120° C. using a roll-press machine. The resulting electrode was heat-treated in a nitrogen atmosphere. The electrode resistance of the electrode after the heat treatment was measured by Loresta MCP-T610 (manufactured by Mitsubishi Chemical Analytec Co., Ltd.) using a terminal AP2 probe. The terminal was measured at three points on the surface of the negative electrode mixture layer, and the average value of these was adopted and shown in the Table.

(Production of Battery)

The negative electrode thus obtained was punched into a circle having a diameter of 14 mmφ, and was subjected to vacuum drying at 160° C. for 6 hours. Then, a cell for electrochemical evaluation, TOMCEL (registered trademark) was fabricated in a glove box under an argon atmosphere. As the counter electrode, metal lithium was used. As the electrolyte, an electrolyte obtained by dissolving $LiPF_6$ into a carbonate-based mixed solvent so as to achieve 1 mol/l was used. As the separator, a polypropylene porous film was used.

<Evaluation of Battery Characteristics>

(Battery Performance Evaluation Test)

The cell for electrochemical evaluation TOMCEL (registered trademark) prepared as described above was subjected to an initial activation using a method described in the following. The produced cell for electrochemical evaluation TOMCEL (registered trademark) was left to stand for 6 hours. Thereafter, the cell was charged at 25° C. in a 0.1 C constant current/constant potential up to 0.01 V (charging was terminated when the current value reached 0.01 C), and was then discharged in a 0.1 C constant current down to 1.0 V. This process was repeated in three cycles. Here, the current value actually set was calculated from the content of the negative electrode active material in the negative electrode.

(Discharge Profile Shape)

Based on the discharge curve of the first cycle obtained as described above, the "discharge profile shape" was determined. That is, the obtained discharge curve was linearly approximated, and the heights of the correlation coefficients were compared to obtain an index of the "discharge profile shape". In Table 1, the results are shown as relative values when the numerical value in Comparative Example 3 is set to 100. Here, when the electric potential changes continuously in a period from the initial stage to the last stage of discharge, that is, when the linearity is high, the correlation coefficient in the linear approximation becomes high, indicating that there is no plateau.

(Discharge Profile Retention Characteristics at High Rate)

The discharge rate characteristics were evaluated using the cell for electrochemical evaluation TOMCEL which was initially activated as described above. First, the cell was charged at 25° C. in a 0.1 C constant current/constant potential up to 0.01 V (charging was terminated when the current value reached 0.01 C), and was then discharged in a 5 C constant current down to 1.0 V.

The "discharge profile shape" was determined from the discharge curve in 5 C, and the index of the "discharge profile shape" in 5 C was determined. The ratio of the "discharge profile shape" index in 5 C to the "discharge profile shape" index in 0.1 C was defined as "discharge profile retention characteristics at high rate". In Table 1, the results are shown as indices when the numerical value in Comparative Example 3 is set to 100.

(45° C. Cycle Characteristics)

The cell for electrochemical evaluation TOMCEL (registered trademark) was produced in the same manner as described above and was left to stand for 6 hours. Thereafter, the cell was charged at 25° C. in a 0.1 C constant current/constant potential up to 0.01 V (charging was terminated when the current value reached 0.01 C), and was then discharged in a 0.1 C constant current down to 1.0 V.

This process was repeated in three cycles. Here, the current value actually set was calculated from the content of the negative electrode active material in the negative electrode. Using the cell for electrochemical evaluation TOMCEL which was initially activated as described above, a charge and discharge test was performed by a method described below, and the 45° C. cycle characteristics were evaluated. The cell was placed in an environmental tester in which an environmental temperature for battery charge and discharge was set to 45° C., and was prepared so as to be able to be charged and discharged. Then, the cell was left to stand for 5 hours such that the cell temperature became the environmental temperature. Thereafter, with the charge and discharge range being set at 0.01 V to 1.0 V, the first cycle charge and discharge was performed in which the charge was performed in a 0.1 C constant current/constant potential and the discharge was performed in a 0.1 C constant current; the charge and discharge cycle in 1 C was then performed 98 times; and after that, the charge and discharge cycle in 0.1 C was performed once. The C rate was calculated on the basis of 25° C. in the initial activation and of the discharge capacity at the 3rd cycle. The percentage (%) of the value obtained by dividing the discharge capacity at the 100th cycle by the discharge capacity at the 2nd cycle was obtained as a value of the 45° C. cycle characteristics. In Table 1, the results are shown as indices when the numerical value in Comparative Example 3 is set to 100.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Si | wt % | 70 | 76 | 84 | 66 | 99 | 76 | 63 |
| O | wt % | 3.3 | 2.3 | 1.8 | 2.9 | 0.6 | — | — |
| Si(111) full width at half maximum | ° | 0.88 | 0.99 | 0.91 | 0.85 | 0.13 | 0.21 | 0.13 |
| Si(111) peak intensity | cps | 580 | 1198 | 1980 | 792 | 82962 | 7151 | 7025 |
| Si(111) crystallite size | Å | 34 | 79 | 91 | 54 | 902 | 434 | 880 |
| M element | — | Ti | Ti | Ti | Ti, Mn | — | Ti | Ti |
| M element | wt % | 26 | 20 | 15 | 23 | — | 23 | 37 |
| True density | g/cm$^3$ | 3.2 | 2.9 | 2.7 | 3.2 | 2.4 | 3.0 | 3.7 |
| Intensity ratio of Si(111) peak to main peak of $M_xSi_y$ | — | 0.20 | 0.45 | 0.99 | 0.19 | — | 1.83 | 1.04 |
| D50 | μm | 2.6 | 2.0 | 2.9 | 2.3 | 2.7 | 4.9 | 3.9 |
| SSA | m$^2$/g | 4.9 | 5.5 | 6.8 | 4.6 | 2.7 | 4.6 | 1.6 |
| Electrode resistance | Ω | 7 | 9 | 19 | 53 | 528200 | 51 | 8 |
| Discharge profile shape | — | 104 | 101 | 101 | 105 | 97 | 99 | 100 |
| Discharge profile retention characteristics at high rate | — | 104 | 102 | 103 | 102 | 89 | 95 | 100 |
| 45° C. cycle characteristics | — | 114 | 109 | 107 | 112 | 100 | 94 | 100 |

From the results of Examples and the tests which have been so far conducted by the inventors, with regard to the Si-based negative electrode active material comprising Si and a compound containing Si and a semimetal/metal element M, it is found that, when the content of Si in the negative electrode active material is more than 50 wt %; the content of oxygen atoms (O) is less than 30 wt %; the content of the semimetal/metal element M is more than 10 wt % and less than 50 wt %; in the X-ray diffraction pattern measured by a powder X-ray diffraction (XRD) device using Cu-Kα1 rays, the full width at half maximum of the peak of the (111) plane of Si is 0.25° or more; the peak intensity of the (111) plane of Si is less than 20,000 cps; and the true density is 2.5 g/cm$^3$ or more, the cycle characteristics can be improved, the plateau region in the discharge profile can be reduced or eliminated, and further the discharging can be performed while maintaining the profile even at a high-rate.

The invention claimed is:

1. A Si-based negative electrode active material consisting of:
   a) Si;
   b) oxygen (O); and
   c) a compound containing Si and one or more elements M selected from the group consisting of, Ti, V, Mn, Fe, Co, Ni, Y, Zr, Nb, Mo, Ta, and W,
   wherein the content of Si in the negative electrode active material is more than 50 wt %; the content of oxygen atoms (O) is more than 0 wt % and less than 30 wt %; the content of the element M is more than 10 wt % and less than 50 wt %,
   wherein in an X-ray diffraction pattern of the negative electrode active material measured by a powder X-ray diffraction (XRD) device using Cu-Kα1 rays, a full width at half maximum of a peak of a (111) plane of Si is 0.25° or more; and a peak intensity of the peak of the (111) plane of Si is less than 20,000 cps; and, wherein a true density of the Si-based negative electrode active material is 2.5 g/cm$^3$ or more.

2. The Si-based negative electrode active material according to claim 1, wherein the compound containing Si and the element M is a silicide represented by $M_xSi_y$, where $0.1 \leq x/y \leq 7.0$.

3. The Si-based negative electrode active material according to claim 2, wherein in an X-ray diffraction pattern measured by a powder X-ray diffraction (XRD) device using Cu-Kα1 rays, the ratio of the peak intensity of the peak of the (111) plane of Si to the peak intensity of the main peak of the silicide represented by $M_xSi_y$ is less than 1.

4. The Si-based negative electrode active material according to claim 1, wherein a D50 particle size of the Si-based negative electrode active material determined by a laser diffraction scattering particle size distribution measuring method is less than 4 μm.

5. The Si-based negative electrode active material according to claim 1, wherein a specific surface area (SSA) of the Si-based negative electrode material is 3 m$^2$/g or more.

6. The Si-based negative electrode active material according to claim 3, wherein a D50 particle size of the Si-based negative electrode active material determined by a laser diffraction scattering particle size distribution measuring method is less than 4 μm.

7. The Si-based negative electrode active material according to claim 3, wherein a D50 particle size of the Si-based negative electrode active material determined by a laser diffraction scattering particle size distribution measuring method is less than 4 μm.

8. The Si-based negative electrode active material according to claim 2, wherein a specific surface area (SSA) of the Si-based negative electrode material is 3 m$^2$/g or more.

9. The Si-based negative electrode active material according to claim 4, wherein a specific surface area (SSA) of the Si-based negative electrode material is 3 m$^2$/g or more.

10. The Si-based negative electrode active material according to claim 5, wherein a specific surface area (SSA) of the Si-based negative electrode material is 3 m$^2$/g or more.

* * * * *

UNITED STATES PATENT AND TRADEMARK OFFICE
CERTIFICATE OF CORRECTION

PATENT NO. : 11,831,007 B2
APPLICATION NO. : 16/637056
DATED : November 28, 2023
INVENTOR(S) : Tetsuya Mitsumoto It is certified that error appears in the above-identified patent and that said Letters Patent is hereby corrected as shown below:

In the Claims

Column 24, Line 2, Claim 6, delete "3," and insert -- 2, --

Column 24, Line 16, Claim 9, delete "4," and insert -- 3, --

Column 24, Line 19, Claim 10, delete "5," and insert -- 4, --

Signed and Sealed this
Twenty-sixth Day of March, 2024

Katherine Kelly Vidal
*Director of the United States Patent and Trademark Office*